United States Patent [19]
Geiger et al.

[11] 3,763,834

[45] Oct. 9, 1973

[54] CYLINDER ARRANGEMENT HAVING A COMBUSTION AND A PRECOMBUSTION CHAMBER THEREIN AND A SEPARATE FUEL SUPPLY OR DOSING MEANS THEREFOR

[75] Inventors: Istvan Geiger; Gerd Decker, both of Wolfsburg, Germany

[73] Assignee: Volkswagenwerk Aktiengesellschaft, Wolfsburg, Germany

[22] Filed: July 12, 1971

[21] Appl. No.: 161,629

[30] Foreign Application Priority Data
July 13, 1970 Germany.................. P 20 38 097.6

[52] U.S. Cl. ...... 123/32 SP, 123/33 VC, 123/191 S, 123/32 C, 123/32 D
[51] Int. Cl. ............................................ F02b 19/00
[58] Field of Search .................. 123/33 VC, 32 K, 123/32 SP, 32 B, 32 C, 32 D, 48 D, 191 S, 90.12

[56] References Cited
UNITED STATES PATENTS

| 2,184,357 | 12/1939 | Mallory | 123/32 ST |
| 2,422,610 | 6/1947 | Bagnulo | 123/32 SP |
| 2,065,419 | 12/1936 | Bagnulo | 123/32 SP |
| 3,230,939 | 1/1966 | Goossak | 123/32 SP |
| 3,580,231 | 5/1971 | Bradbury | 123/33 VC |
| 1,814,676 | 7/1931 | Estep | 123/32 SP |

Primary Examiner—Laurence M. Goodridge
Assistant Examiner—Cort Flint
Attorney—Ernest F. Marmorek

[57] ABSTRACT

In a combustion engine for motor vehicles a cylinder arrangement having a combustion chamber and a precombustion chamber in communication therewith and receiving the spark-plug with its electrodes, a first fuel supply or dosing arrangement opening into the combustion chamber and a second fuel supply or dosing arrangement opening into the precombustion chamber, an operating means associated with the first and second fuel dosing means and having a member following the different predetermined positions representative of the operating state of the first fuel supply or dosing arrangement, such member being constructed to define the operating state of the second fuel supply or dosing arrangement, wherein such member comprises a stem assuming different and predetermined axial positions and having a cross sectional profiling thereon, means coupled to the cross sectional profiling and defining the predetermined operating states of the second fuel dosing arrangement, and wherein further the cross sectional profiling is formed as a cam, an operating bar slidably mounted against the force of a spring transversely with respect to the stem, the camming being operatively coupled with such bar which in turn is operatively coupled with the second fuel supply or dosing arrangement.

6 Claims, 3 Drawing Figures

PATENTED OCT 9 1973 3,763,834

INVENTORS:
ISTVAN GEIGER and
BY GERD DECKER

THEIR ATTORNEY.

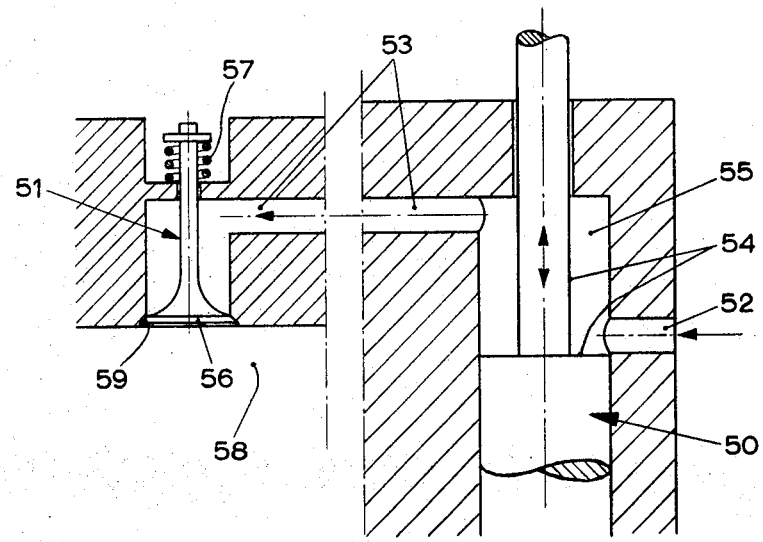

CYLINDER ARRANGEMENT HAVING A COMBUSTION AND A PRECOMBUSTION CHAMBER THEREIN AND A SEPARATE FUEL SUPPLY OR DOSING MEANS THEREFOR

FIELD OF THE INVENTION

The present invention relates to a cylinder arrangement having a combustion and a precombustion or ante-chamber communicating with the combustion chamber therein and wherein the precombustion chamber receives the electrodes of a spark-plug, a first fuel supply or dosing means for the combustion chamber and a second fuel supply or dosing means for the precombustion chamber and an operating device intercoupling the first and second fuel dosing means.

BACKGROUND OF THE INVENTION

The types of machines which, for example, have been described by Schlamann are said to have the advantage in motor vehicles in that the combustion chamber can be supplied by a relatively poor mixture and thereby a good fuel burning efficiency and a very advantageous exhaust gas combination is attained and, at the same time only the precombustion chamber which has a relatively small volume should be supplied with a more combustible, that is, with a much richer mixture.

A serious disadvantage associated with the practical operation of such machines resides in that a pair of separate fuel supply or dosing means and a pair of control devices for these supply means are required. The control devices must be designed to provide for the accurate timing of the supply to the precombustion chamber at a certain predetermined time instant, that is, shortly before the instant of the ignition.

BRIEF SUMMARY OF THE INVENTION

It is, therefore, an object of the present invention to provide an improved cylinder arrangement having the above-mentioned subdivision into a combustion and a precombustion chamber and a pair of separate fuel dosing or supply means for such chambers which, however, have a very simply constructed operating or control device, especially for the precombustion chamber.

In accordance with the present invention a cylinder arrangement for the combustion engine is characterized in that a member is provided which follows the different predetermined positions of the first fuel dosing means according to operating states thereof, and at the same time it is constructed as a device which defines the different operating states of the second fuel dosing means and serves as its actuating member.

Irrespective thereof that the fuel supply or dosing is performed by means of valves which supply a fuel mixed with air or by means of injection nozzles, the invention is just as well applicable to both types of supply means in that it requires that the movements of the parts of the first fuel supply or dosing means are used to control the second fuel supply or dosing means operating on the precombustion chamber. The invention starts out from the principle that the different operating states of the first fuel supply or dosing means can be used as a time reference for the actuation or closing of the second fuel supply or dosing means. By employing this principle according to the present invention, the operating device for the second fuel supply or dosing means becomes more simple in construction than arrangements which control both fuel dosing means independently.

Obviously there can be a long series of constructively different embodiments of the present invention. Thus, for instance, the control member can be a stem assuming different axial positions and have different cross sectional profiling, the axial movements or positions of which by employing additional coupling elements can be translated into operating states of the second fuel supply or dosing means. An essentially compact embodiment of this device is a construction in which an operating bar axially moves against the force of a spring transversely with respect to the cross sectionally profiled stem acting on it as a cam and which is coupled to the second fuel supply or dosing means. This embodiment is preferably used only when the space conditions within the cylinder arrangement allow its use and, as a matter of fact, they require that the fuel supply or dosing devices be constructed under an angle with respect to each other and, for example, both fuel supply or dosing means can be constructed as valves which carry a stem and the operating bar as valve shaft, a valve plate, and wherein a plane passing through the valve plates can be placed under an angle of less than 180° and preferably at an angle of 90° with respect to each other. Under these conditions the precombustion chamber in a cross sectional picture lies practically next to the suction conduit for the poor mixture.

The arrangement can be constructed in such a manner that the operating device has a membrane or a piston coupled with the second fuel supply or dosing means and includes also a suction conduit coupled with a pressure chamber, but preferably returned to the first fuel supply means by way of a pressure translating conduit and whrein the cross sectional profiling is performed on the valve placed in the pressure translating conduit itself.

In this embodiment the sub-atmospheric pressure prevailing in the first fuel supply means is used for the operation of the second fuel supply means over a membrane, and wherein the sub-atmospheric pressure translation occurs in dependence from the operating state of the first fuel supply device.

Preferably, the valve is a two-way valve which connects the membrane over the pressure translating conduit at actuated first fuel supply conditions with the suction conduit, otherwise with the atmosphere.

Even when the cross sectional profiling, as in the last described cases forms a part of the valve, it can be done very simply by providing a constriction or a reduction which in a certain position over the length of the pressure translating conduit forms a passage for the pressure medium.

There are obviously other constructive variations possible, those for example, wherein the force translation is performed by means of hydraulic or pneumatic arrangement.

BRIEF DESCRIPTION OF THE DRAWINGS

The invention will become more readily apparent from the following description of preferred embodiments thereof shown in the accompanying drawings, in which:

FIG. 3 illustrates the case in which the profile member is formed as a mixture pump.

DESCRIPTION OF THE PREFERRED EMBODIMENT

Before going into a detailed discussion of the preferred embodiments, it should be noted that in all illustrated embodiments it has been assumed that both fuel supply means are constructed by valves, notwithstanding the fact that a mixture supply is performed over a carburetor or a suction pipe injector. Obviously, the invention is successfully applied also to cases where injection nozzles are used with injection pumps.

Figure 1:
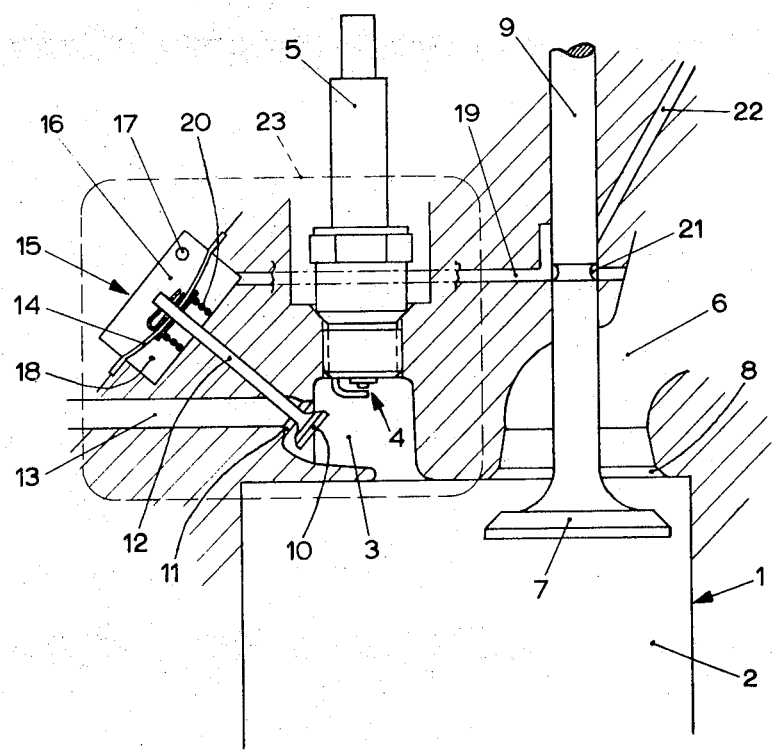
FIG. 1 is an elevational view, partly in section, of an embodiment of the present invention in which only those parts of the cylinder arrangement are shown which are essential for the understanding of the present invention. The embodiment shown in FIG. 1 represents the case in which a stem of the first fuel supply is part of a valve and is coordinated into a pressure translating conduit of the operating device for the second fuel supply.

With particular reference to the embodiment illustrated in FIG. 1, it is seen that the cylinder arrangement which is generally identified by the reference numeral 1, comprises a piston which is not shown on the drawing and which in a given case can also be a rotary type piston. The piston is placed into a combustion chamber 2. The cylinder includes also a precombustion or antechamber 3 which receives the electrodes 4 of the spark-plug 5. The combustion chamber 2 is designed to provide a desirable fuel burn efficiency and a good exhaust gas content even on a poor mixture which is supplied thereto from a carburetor, not shown on the drawing, and which can be of a known construction and which is connected to the combustion chamber by means of a suction conduit 6 and through an inlet valve which essentially consists of a valve plate 7 and a valve seat 8. The valve plate 7 is fixedly connected with a valve stem 9. The actuation of the valve stem 9 and thereby of the valve plate 7 occurs in a known manner by means of a cam controlled by the revolutions of the engine.

While through the combustion chamber 2 a poor mixture is supplied, the precombustion or antechamber 3 is supplied with a very combustible, that is, with a relatively rich mixture which is supplied thereto by means of a second fuel supply means at a certain time instant which preferably falls just before the ignition time of the spark-plug 5. Also this fuel supply is constructed as a valve having a valve plate 10, a valve seat 11 and a valve stem 12. This supply device further includes a separate suction conduit 13 which is connected to a carburetor provided in addition to the carburetor supplying the suction tube 6.

An essential operating member for the second valve 10 is a membrane 14 which subdivides the chamber 15 into two partial or sub-chambers; the sub-chamber 16, seen in FIG. 1, is continuously connected by means of an aperture 17 with the atmosphere. The lower sub-chamber 18, seen also in FIG. 1, is temporarily connected by means of a pressure translating conduit 19 with the suction conduit 6, so that in the sub-chamber 18 the sub-atmospheric pressure of the suction conduit 6 prevails. The sub-atmospheric pressure has as its result that the membrane 14 is affected by such a large pressure difference that the membrane 14 flexes against the force of a spring 20 in the direction shown in the drawing, and by means of the valve stem 12 with which it is fixedly connected lifts off the valve plate 10 from its valve seat 11.

The control of this valve operation occurs according to the present invention by means of a profiled member in the region of the valve stem 9 of the first supply device, which profiled member in the present embodiment is illustrated as an annular groove 21 which forms actually the movable part of a valve and which, in dependence from the axial position of the stem 9 and thereby from the operating state of the valve 7, 8, connects the lower chamber 18 by means of the pressure translating conduit 5 either to the suction tube 6 or by means of a further conduit 22 with the atmosphere. In other words, in the illustrated embodiment of FIG. 1, the inlet valve 7, 8 controlling the inlet of the poor mixture, when it is open actuates the sub-atmospheric pressure in the sub-chamber 18 in the above-described manner and thereby opens also the valve 10, 11, while the valve 7, 8 when being closed and even during its partially open position establishes by means of the annular groove 21 a connection between the pressure translating conduit 19 on one hand and over the further conduit 22, on the other hand. In this case there is a pressure balance present in the sub-chambers 16 and 18, so that the valve 10, 11 under the effect of the spring 20 and of the pressure of the precombustion chamber 3 becomes closed again.

The above-described solution offered by the present invention makes it possible to coordinate certain devices and parts connected with the precombustion chamber 3 and also the cylinder parts surrounding the precombustion chamber 3, along with the spark-plug, the second valve itself, including its operating arrangement and the further suction conduit into a cover-like member 23 connected with the cylinder itself.

Figure 2:
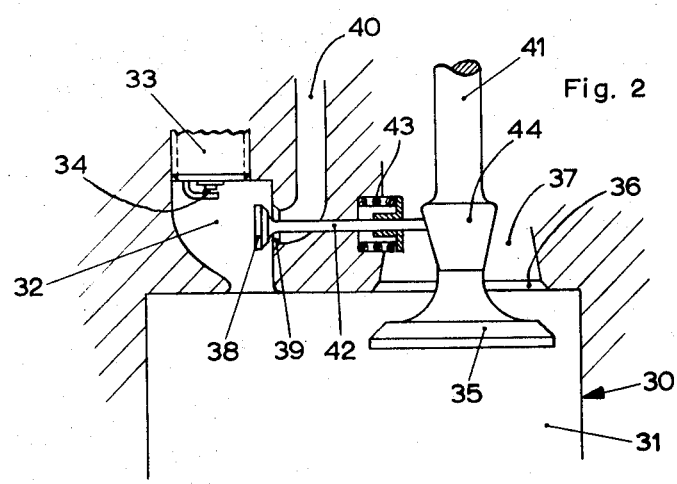
FIG. 2 illustrates schematically, in elevational view, and partly in section, a purely mechanically operating device for the second fuel supply in which a stem of the first fuel supply is provided by a profile serving as a cam.

Also in the embodiment illustrated in FIG. 2, the cylinder arrangement 13 comprises a combustion chamber 31 and a precombustion chamber 32 into which a spark-plug 33 with its electrode arrangement 34, protrudes. It is again assumed that the fuel supply is performed by means of valves and the valve assigned to the combustion chamber 31 comprises essentially a valve plate 35 and a valve seat 36 to which again a suction conduit 37 is connected, while the precombustion chamber 32 is supplied by a further valve having a valve plate 37, a valve seat 39 coupled to a further suction conduit 40. Both valve plates 35 and 38 are supported by a stem 41, 42, respectively, and according to the present invention only the stem 41 is under the effect of a cam. The valve stem 42, on the other hand, which is placed at a rectangle with respect to the axis of the stem 41, is mounted in a slidable manner against the force of a spring 43. Said stem 42 is operated by a cone-shaped profile member 44 of the stem 41, and the profile member functions as a cam. The operation again is as follows: When the first inlet valve 35, 36 is fully opened (see FIG. 2) also the valve 38, 39 becomes opened, while the latter valve becomes closed only when the valve 35, 36 is fully closed.

It is clear that the illustated cross sectionally profiled member can be constructed also in other fashion and particularly in such a manner that time-wise a different actuation of the second fuel supply or dosing means for the precombustion chamber occurs. It is also possible to mount the stem 42 upwardly or downwardly movably in a resilient manner so that it becomes axially shifted only up or down and during the movements of the cross sectionally profiled member 44. Under this condition one could provide a divided or sectionalized stem 42, both parts of which are connected by means of a transversely running axle. As a result, one could attain a singular opening of the valve 38, 39 only during the closing or opening of the valve 35, 36. In the first case one could approximate more closely the instant of the ignition.

In the embodiment illustrated in FIG. 3, the reference numeral 50 identifies the stem (shaft) of the first and the reference numeral 51 identifies the stem (shaft) of the second fuel supply or dosing means. The pressure translating conduit which functions at the same time as a mixture supply conduit is made up from channels or passages 52 and 53. The channel or passage 52 is coupled to a mixture producing device, such as a re-circulated air carburetor having a mixture pump inserted therebetween. The essential portion of this mixture pump comprises a stepped cross sectionally profiled member 54 which, during the upward movement of the stem 50, forces a mixture amount that streamed into the pump chamber 55 through the lower lying passage 52, into the higher lying passage 53 against the valve plate 56, so that the valve plate 56 is lifted off from its valve seat 59 against the force of the spring 57 and the compression pressure in the precombustion chamber 58. In the present construction the mixture which streams into the precombustion chamber 58 forms simultaneously the pressure medium for the operation of the valve 56, 59. One could, however, employ also an additional pressure medium which could be guided in an additional pressure translating conduit and operate on a piston on the stem 51. In principle, such arrangement would look like the arrangement illustrated in FIG. 2, except that the pressure translating conduit would run into the upper partial chamber 16.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desired to be secured by Letters Patent, is as follows:

1. In a combustion engine for motor vehicles, a cylinder arrangement comprising a combustion chamber, a precombustion chamber in communication with said combustion chamber, spark-plug means having electrodes in communication with said precombustion chamber, a first fuel supply or dosing means associated with said combustion chamber and a second fuel supply or dosing means associated with said precombustion chamber, an operating means associated with said first and second fuel supply or dosing means, said first fuel suply or dosing means comprising a member assuming different predetermined positions representative of the operating states of the first fuel supply or dosing means and including a stem following the different and predetermined axial positions and having a cross sectional profiling thereon, said operating means comprising fluid moving means coupled with said second fuel supply or dosing means, and further comprising a pressure translating conduit coupled to a pressure chamber and to the cross sectional profiling of the stem.

2. The cylinder arrangement as claimed in claim 1, wherein said cross-sectional profiling includes valve means in the form of a two-way valve and said fluid moving means including a membrane which at an actuated condition of said first fuel supply or dosing means connects said pressure translating conduit with said pressure chamber, and under other conditions connects it with the atmosphere.

3. In a combustion engine for motor vehicles, a cylinder arrangement comprising a combustion chamber, a precombustion chamber in communication with said combustion chamber, spark-plug means having electrodes in communication with said precombustion chamber, a first fuel supply or dosing means associated with said combustion chamber and a second fuel supply or dosing means associated with said precombustion chamber, an operating means associated with said first and second fuel supply or dosing means, said first fuel supply or dosing means comprising a member assuming different predetermined positions representative of the operating states of the first fuel supply or dosing means and including a stem following the different and predetermined axial positions and having a cross sectional profiling thereon said second fuel supply or dosing means including a valve and said operating means including a pressure translating conduit leading to a mixture forming device, such as a carburetor, and which at the same time forms a mixture conduit, said cross sectional profiling being in the form of a valve or a pump which is placed in the pressure translating conduit.

4. The cylinder arrangement as claimed in claim 3, wherein said cross sectional profiling is a reduction type profiling.

5. The cylinder arrangement, as claimed in claim 1, said fluid moving means including a membrane.

6. The cylinder arrangement, as claimed in claim 1, said fluid moving means including a cylinder and piston.

* * * * *